Oct. 7, 1952     W. WALKER     2,613,109
APPARATUS FOR DISTRIBUTING FLUENT MATERIALS
Filed Jan. 2, 1947     11 Sheets-Sheet 1

Inventor:
Walter Walker
BY
Attorney.

Oct. 7, 1952          W. WALKER          2,613,109
APPARATUS FOR DISTRIBUTING FLUENT MATERIALS
Filed Jan. 2, 1947          11 Sheets-Sheet 2

Oct. 7, 1952 W. WALKER 2,613,109
APPARATUS FOR DISTRIBUTING FLUENT MATERIALS
Filed Jan. 2, 1947 11 Sheets-Sheet 7

Oct. 7, 1952 W. WALKER 2,613,109
APPARATUS FOR DISTRIBUTING FLUENT MATERIALS
Filed Jan. 2, 1947 11 Sheets-Sheet 8

Oct. 7, 1952 W. WALKER 2,613,109
APPARATUS FOR DISTRIBUTING FLUENT MATERIALS
Filed Jan. 2, 1947 11 Sheets-Sheet 9

Inventor:
Walter Walker:
BY
Harry N Cook,
Attorney.

Patented Oct. 7, 1952

2,613,109

UNITED STATES PATENT OFFICE 2,613,109

APPARATUS FOR DISTRIBUTING FLUENT MATERIALS

Walter Walker, Short Hills, N. J.

Application January 2, 1947, Serial No. 719,894

4 Claims. (Cl. 299—41)

This invention relates in general to apparatus for distributing fluent materials, such as liquid, powder, gas or smoke, for example insecticides, weed-killing compositions and the like, over large areas of ground or into shrubs and trees.

One object of the invention is to provide apparatus of this character which shall embody novel and improved features of construction, whereby the fluent material, such as insecticide, shall be sprayed or distributed and the foliage at the same time shall be powerfully agitated to ensure a thorough spreading of the insecticide on both the top and bottom sides of the leaves, stems, twigs and branches.

Another object is to provide a vapor or powder-distributing apparatus which shall include means for creating a large and powerful blast of air, and means to introduce into said blast the fluent material to be distributed, whereby the blast of air will pick up, propel and distribute said material over the ground or foliage to be treated and when said material is a liquid it will be distributed in an atomized state.

A further object is to provide such apparatus which shall include novel and improved means for swinging the blast-producing means and vapor or powder-injecting means upwardly and downwardly in vertical planes and horizontally throughout an angle of 360°.

Still further objects of the invention are to provide novel and improved means for conducting the fluent material to be distributed from a source of supply, such as a tank, to the blast-producing means; and to provide a novel and improved distributing nozzle for injecting the fluent material into the proper relation to the blast-producing means.

Other objects are to provide vapor or powder-distributing apparatus of the general character described which can be easily mounted on a motor truck so that the apparatus can be moved about as desired for use at different locations; to provide such apparatus as shall be relatively simple and inexpensive, reliable and durable in construction, and which can be easily operated by relatively unskilled persons, and to obtain other advantages and results that will be brought out by the following description in conjunction with the following drawings, in which:

For the purpose of illustrating my invention, I have shown the support for the distributing apparatus as comprising a motor truck A, but it should be understood that any other suitable supporting structure, for example, the deck of a boat or ship, or a platform, might be utilized.

Mounted on the support A is a vertical pedestal

B on which is mounted a distributing head C. As shown, the pedestal B comprises a base portion 1 which is secured in any suitable manner, as by bolting, to a support such as the floor or chassis 2 of the motor truck A. The pedestal is tubular, and within it is rotatably mounted a tubular post 3 which is supported on ball bearings 4 and 5, said post projecting upwardly beyond the upper end of the tubular pedestal B. As shown, into the lower end of the post is fitted a block 6 on which is screw threaded a nut 7 having a shoulder against which the lower end of the post abuts; and another nut 8 is screw threaded on the lower end of the post and clamps between itself and a shoulder 9 on the post, the ball bearing 5 and a ring gear 10 which meshes with a rack bar 11 for rotating the post within the pedestal.

Adjacent to its upper end the post has a shoulder 12 against which the ball bearing 4 is clamped by a nut 13 threaded on the upper end of the post and between which and the ball bearing is clamped the base 14 of a yoke or bracket D which surrounds said post. The upper end of the post is closed by a plug 15.

The yoke D comprises said base 14 and vertically extending spaced and parallel side pieces 17 secured thereto. Supported by said side pieces is a horizontal shaft 18 which is non-rotatably or rigidly connected to said side pieces in any suitable manner, as by a pin 19 extending through the shaft and a tubular extension 20 on one of the side pieces 17.

Journaled on said shaft, as by ball bearings 21, is a frame 22 for the distributing head which is shown as comprising two spaced and parallel channel bars 23 that have connected to their forward ends a suitable cradle or engine-mounting frame 25 for an internal combustion engine 26, which is preferably of the airplane type, and is so constructed that it will operate in any position, either horizontal or vertical.

Interposed between the engine 26 and the yoke D is a partition or bulkhead 27, and at the opposite end of the engine is an end wall 28 of a casing E which encloses the engine and the yoke D. With this construction, it will be observed that the distributing head including the frame 23 and the engine 26, may swing in vertical planes about the axis of the shaft 18 and may also rotate horizontally about a vertical axis within the pedestal B. To counterbalance the weight of the engine a suitable counterweight 29 is mounted on the end of the frame opposite the engine, and to permit the distributing head to swing in vertical planes, the casing has a slot 30 to provide a clearance for the pedestal during the swinging of the distributing head.

The engine 26 drives an airplane propeller 31 which is mounted in front of the forward wall 28 of the casing and ahead of a distributing nozzle 32 for the fluent material to be distributed. Preferably the end wall 28 is spaced from the side walls of the casing E, as indicated at 33, and the casing has an air inlet 34 to provide a circulation of air around the engine during the operation thereof. The propeller is of the push type, and when operating draws air forwardly so as to create a constant current of air through the casing around the engine and also to draw the fluent material from the distributing nozzle 32 into a blast of air which distributes said fluent material in the form of a cloud over long distances and large areas.

For rotating the distributing head about its vertical axis, the rack bar 11 is slidably mounted in a bearing 35 in the base of the pedestal and is pivotally connected at 36 to the piston rod 37 of a hydraulic piston and cylinder device 38 to the cylinder of which at opposite ends of the piston ring are connected pipes 40 and 41.

For rotating the distributing head in vertical planes about the axis of the shaft 18, I have shown a gear 42 which is keyed upon one end of the shaft 18 and meshes with a rack bar 43 that is slidable in a guide 44 mounted on the frame 22, said rack bar being pivotally connected to the piston rod 45 of a piston and cylinder device 46 to the cylinder of which at opposite sides of the piston therein are connected the pipes or flexible hoses 47 and 48.

The hydraulic pressure for operating the piston and cylinder devices 38 and 46 is supplied by a pump 49 mounted on the body of the motor truck A and driven from the engine of the truck through a belt and pulley connection by a suitable power take-off mechanism 50, the driving shaft of which is designated 50a. The pump 49 cooperates with a reservoir 51 which is connected by pipes 52 and 53 to the respective manually operated valves or controllers 54 and 55 which control the horizontal and vertical swinging of the distributing head, respectively. The outlets of these valves 54 and 55 are connected to a common pipe 56 which leads back to the reservoir 51. It will be understood by those skilled in the art that suitable check valves 57 will be arranged in the respective pipes.

Figure 1:
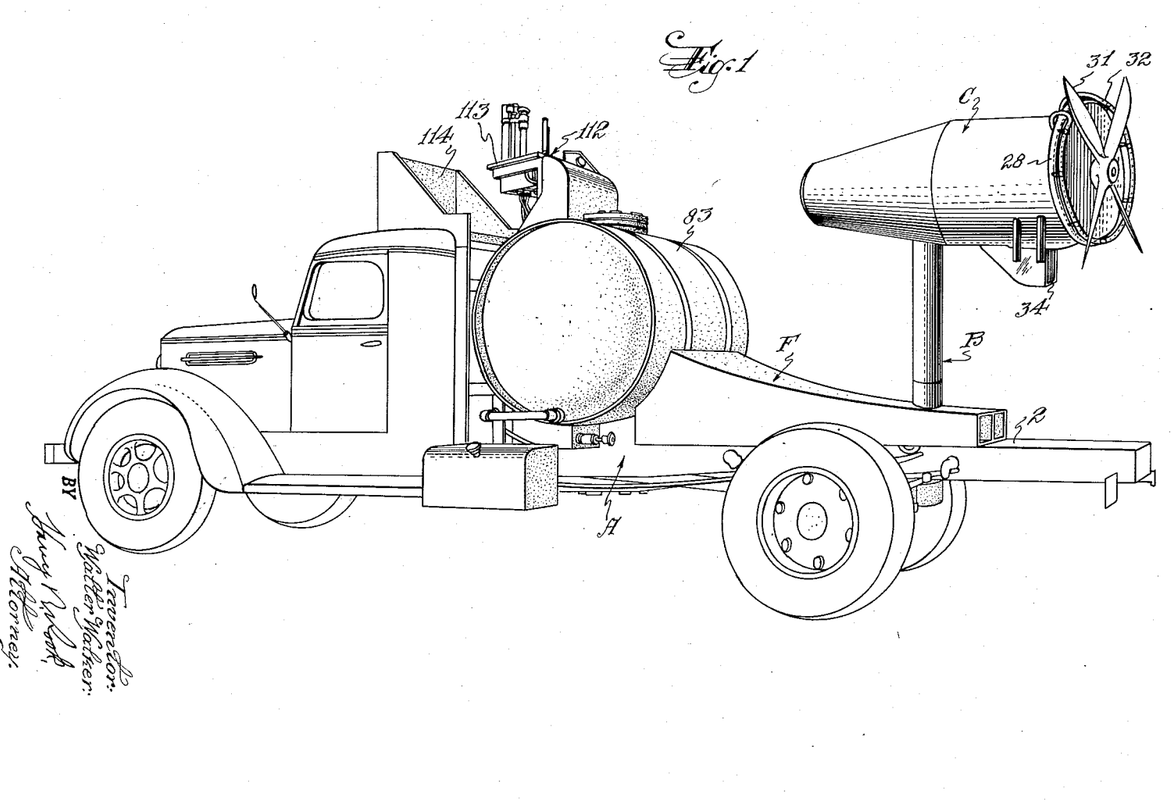
Figure 1 is a perspective view of a vapor and powder-distributing apparatus embodying my invention.
Figures 2, 3, 17:
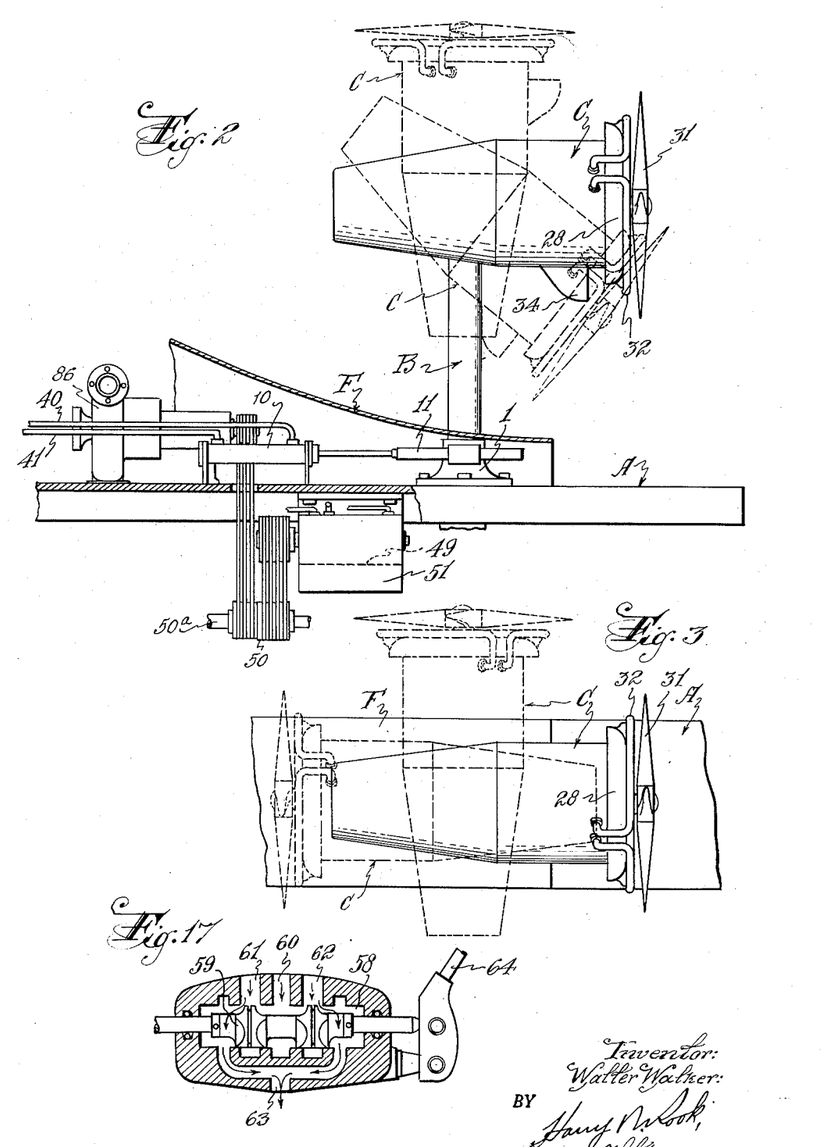
Figure 2 is a fragmentary side elevational view thereof on a reduced scale, and showing the distributing head in its upper and lower positions in dot and dash lines.
Figure 3 is a top plan view of the apparatus as shown in Figure 2, and illustrating the distributing head in different horizontal positions by dot and dash lines.
Figure 17 is a vertical longitudinal sectional view through one of the valves for controlling the hydraulic actuating mechanisms.
Figure 4:
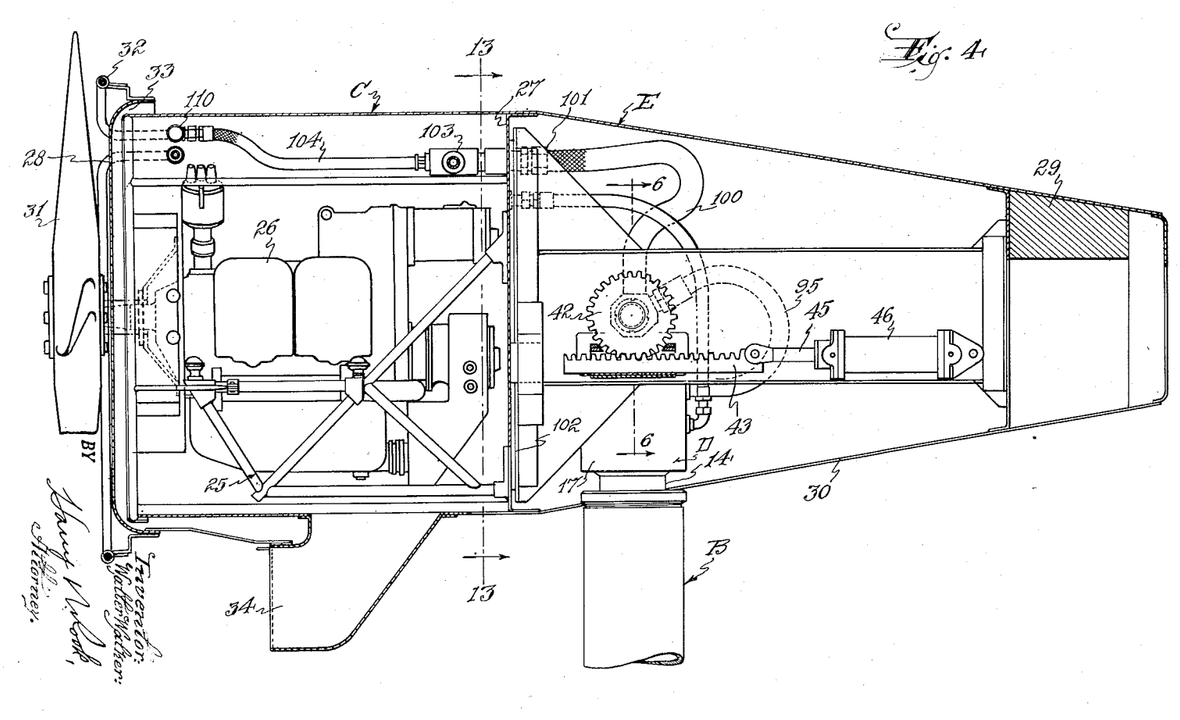
Figure 4 is an enlarged side elevational view of the distributing head with the casing shown in section and portions omitted for clearness in illustration.

The controllers 54 and 55 are identical and may be of any suitable type, but I prefer to use a valve controller such as shown in Figure 17 and each controller comprises a valve chamber 58 in which is reciprocable a double piston valve 59 to cooperate with an inlet port 60, ports 61 and 62 connected respectively to the pipes 40 and 41 or 47 and 48, as the case may be, and an exhaust port 63 connected to the common return pipe 56, as the case may be. The double piston valve 59 is reciprocated by any suitable means such as a hand lever 64. With this construction, it will be observed that when the hand lever 64 of the valve 55 is operated in one direction, the hydraulic pressure will actuate the device 38 so as to rotate the distributing head about its vertical axis in one direction, while when said hand lever is moved in the other direction, the distributing head will be reversely rotated.

By similar manipulation of the hand lever 64 of the valve 54, the distributing head will be swung upwardly and downwardly.

For conducting the fluid under pressure from the reservoir 51 to the hydraulic cylinder and piston device 46 on the distributing head, two tubes 65 and 66 extend upwardly through the post 3 with their lower ends fitted in the block 6 and communicating with the respective passages 67 in a fitting 68 which is rigidly connected to said block by cap screws 69. The passages 67 have connected thereto the respective pipes 70 which are in turn connected to corresponding swivel couplings 71, the swiveled elbows 72 of which have connected thereto pipes 73 and 74 which lead to the valve 54. The upper ends of the tubes 65 and 66 are connected to the respective pipes 47 and 48.

Figure 5:
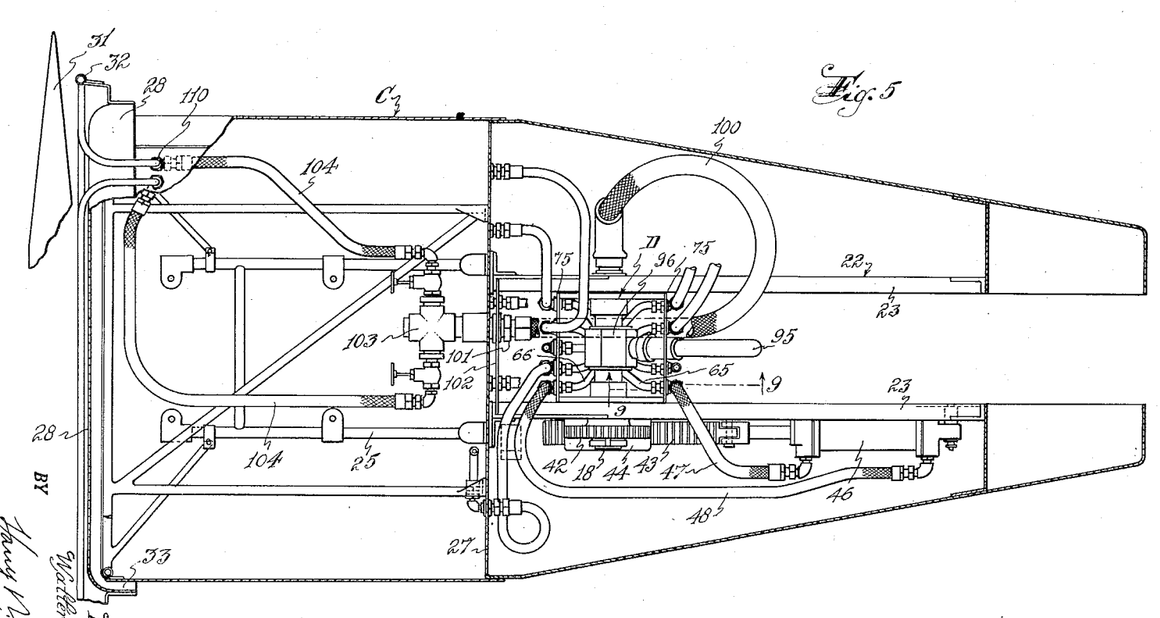
Figure 5 is a top plan view of the distributing head with the casing shown in section and portions omitted for clearness in illustration.
Figure 6:
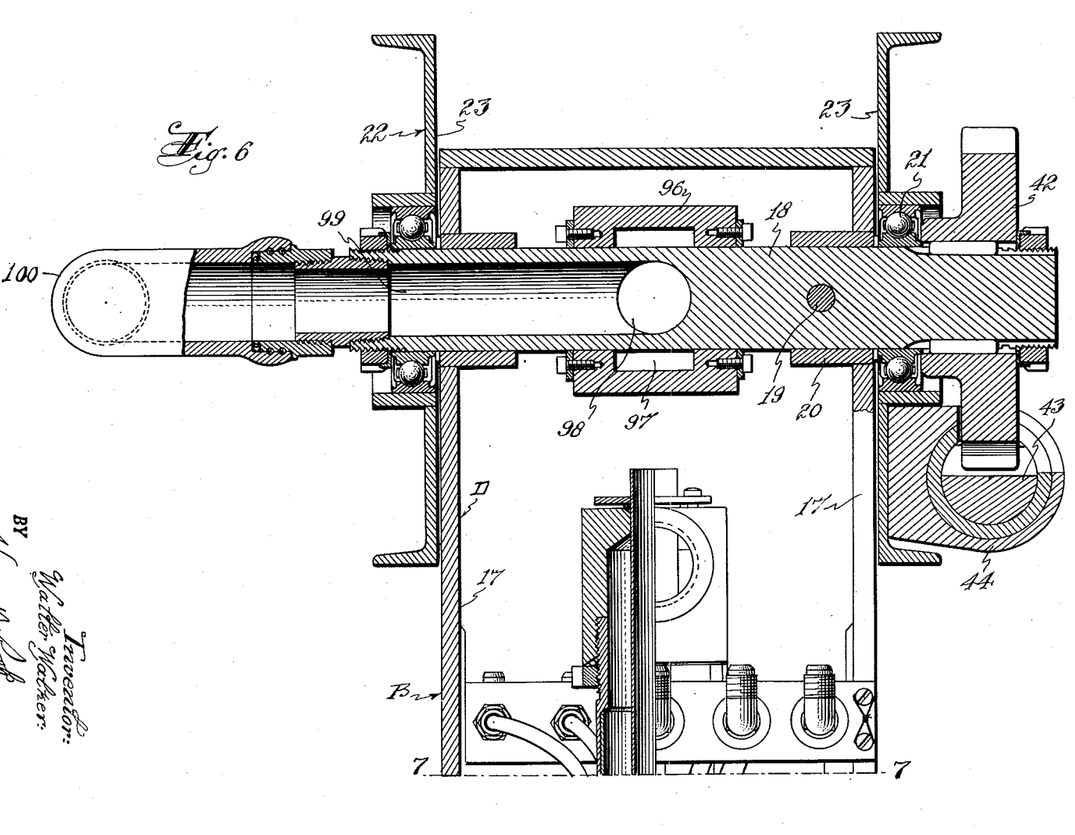
Figure 6 is an enlarged fragmentary vertical sectional view, approximately on the line 6—6 of Figure 4.
Figure 7:
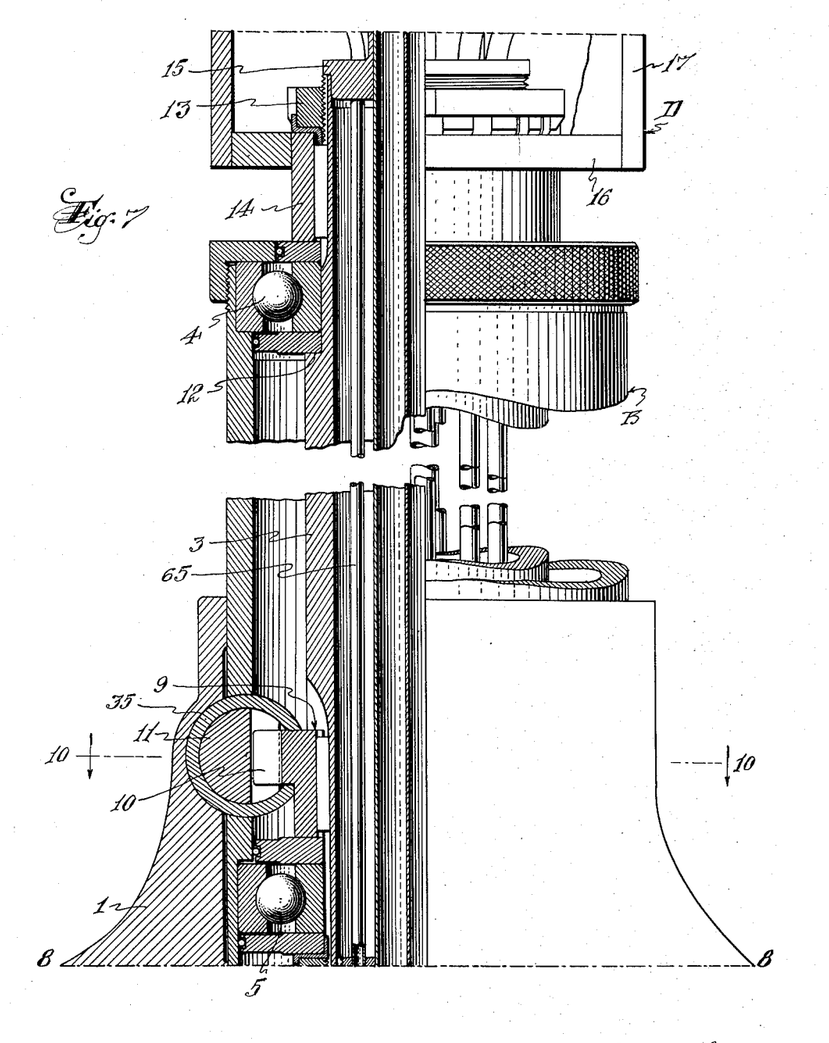
Figure 7 is a view taken on the same plane as Figure 6, and showing a portion of the apparatus below the line 7—7 of Figure 6.
Figures 9, 10, 11:
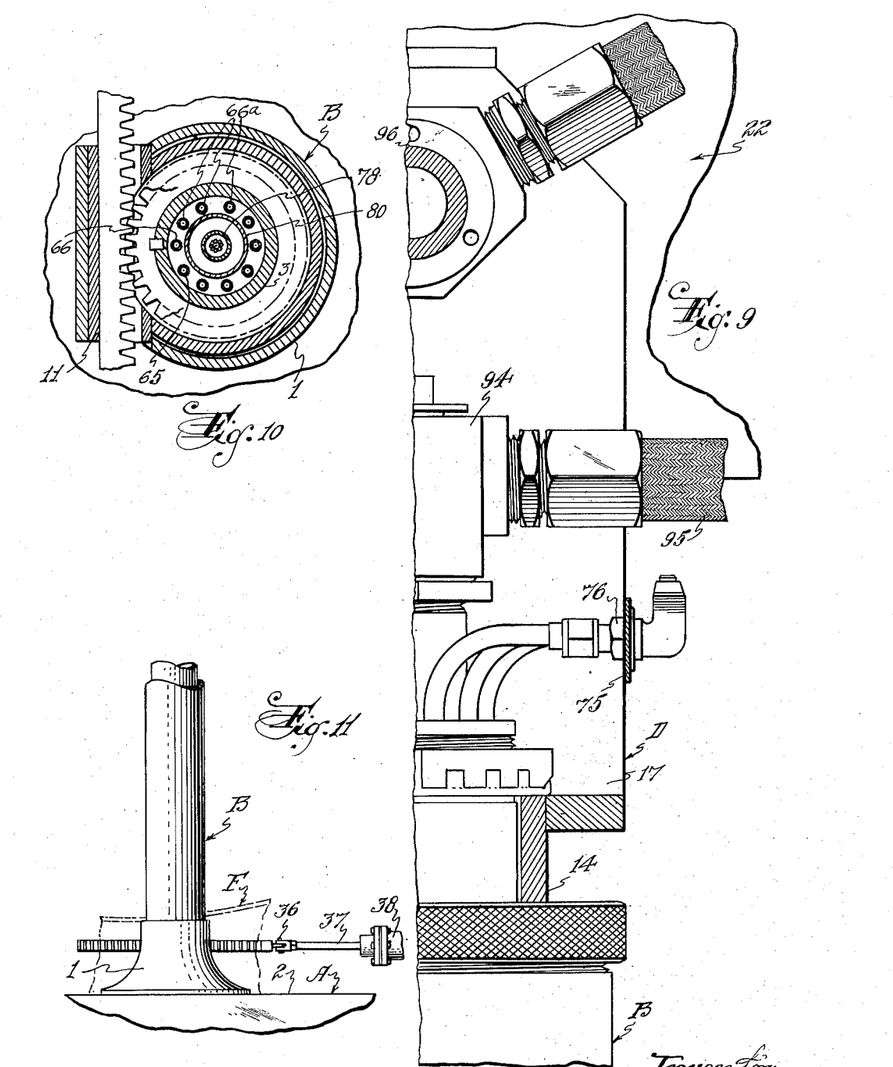
Figure 9 is an enlarged sectional view, taken approximately on the plane of the line 9—9 of Figure 5.
Figure 10 is a fragmentary horizontal sectional view, on a reduced scale, taken approximately on the plane of the line 10—10 of Figure 7.
Figure 11 is a fragmentary side elevational view of the lower portion of the pedestal for the distributing head, viewing the same from the side opposite to that illustrated in Figure 2.
Figure 12:
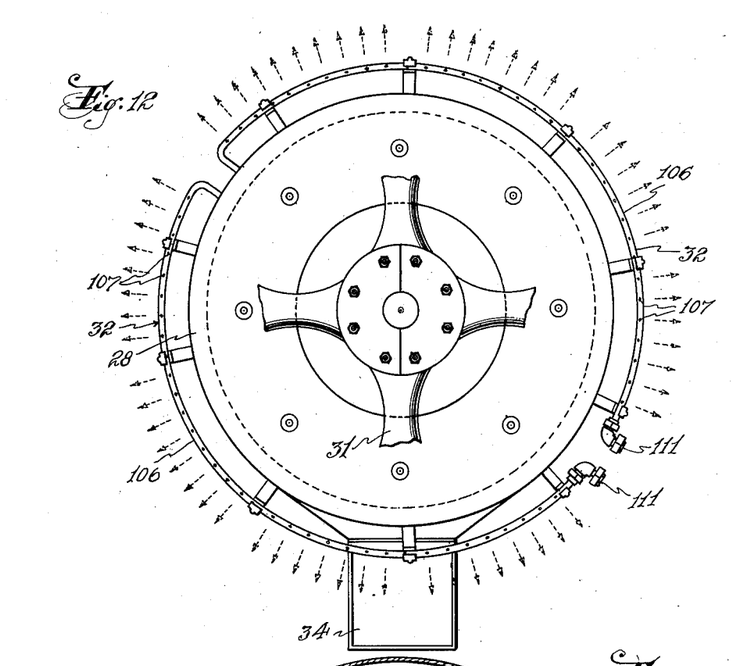
Figure 12 is a schematic front elevational view of the distributing head, with portions of the blast-producing means broken away for clearness in illustration.
Figure 13:
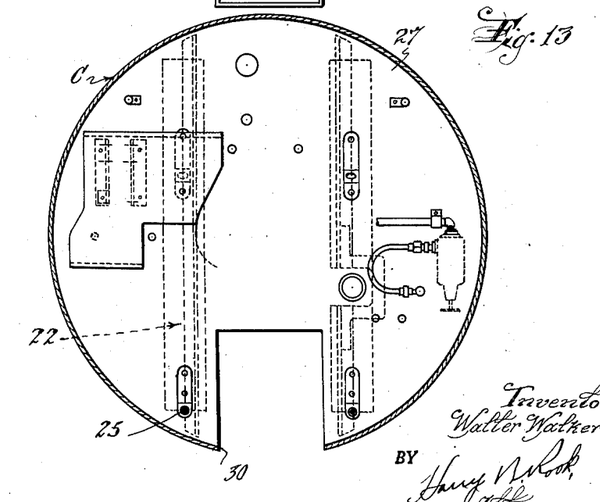
Figure 13 is a transverse vertical sectional view, approximately on the plane of the line 13—13 of Figure 4.

It will be understood by those skilled in the art that other tubes 66a similar to the tubes 65 and 66 may be mounted in the post 3 in the same manner and serve for conducting fuel and oil from the supply tanks to the engine 26, but inasmuch as this forms no particular part of my invention, further description thereof is unnecessary. As best shown in Figures 5 and 9, it will be observed that the yoke D includes two bars 75 on which are mounted pipe fittings 76 for connecting the upper ends of the tubes 65, 66, etc., to the respective tubes or hoses 47, 48, etc.

Such wires 77 as may be necessary, such as ignition wires, may be carried upwardly to the engine through a tube 78 which passes through a larger pipe 80 which extends loosely through the blocks 6 and 15 and projects upwardly to a point just below the shaft 18 and has a fitting 94 at its top through a packing gland in which passes the upper end of the tube 78 whose lower end is secured in a block 79 which closes the lower end of the pipe 80. The wires 77 may be led into the tube 78 through any suitable junction box 81 which may be suspended from a suitable bracket 82 on the underside of the chassis of the motor truck.

Figure 8:
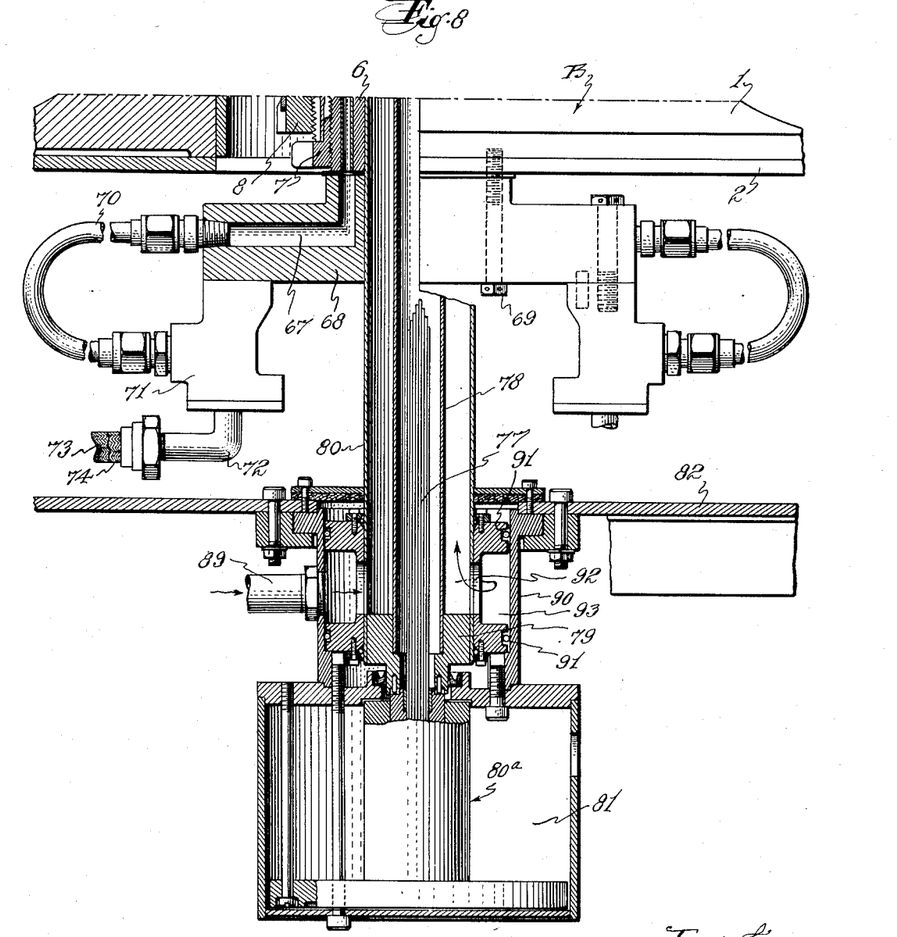
Figure 8 is a like view of the portion of the apparatus below the line 8—8 of Figure 7.
Figure 14:
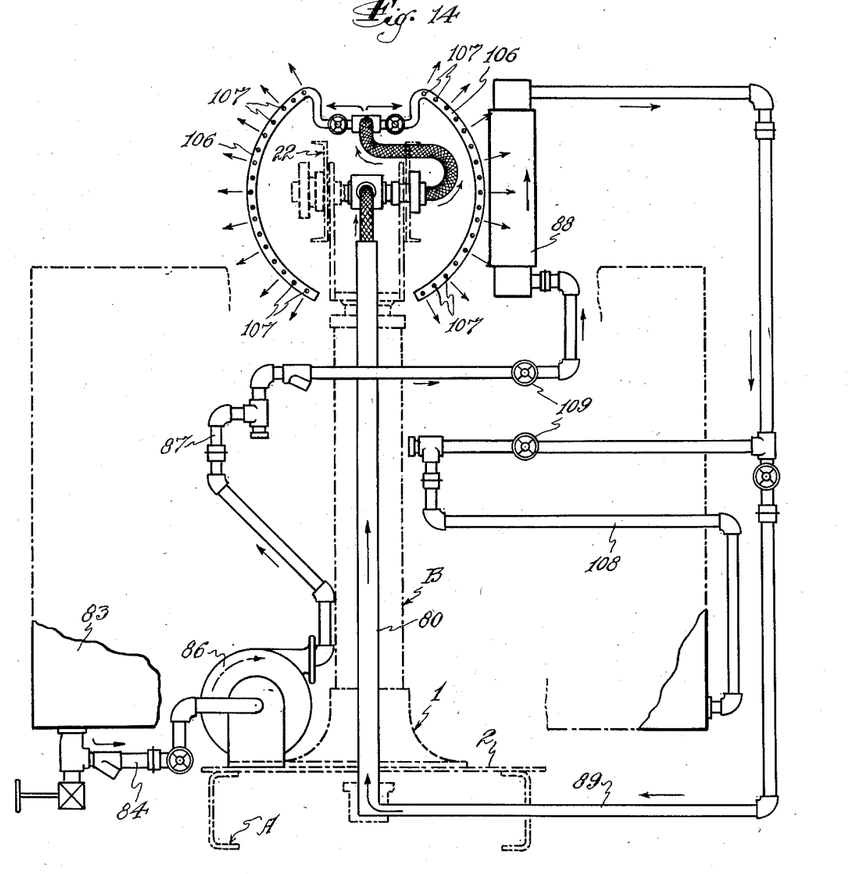
Figure 14 is a schematic illustration of the piping system for conducting the insecticide from the tank to the distributing nozzle.
Figures 15, 16:
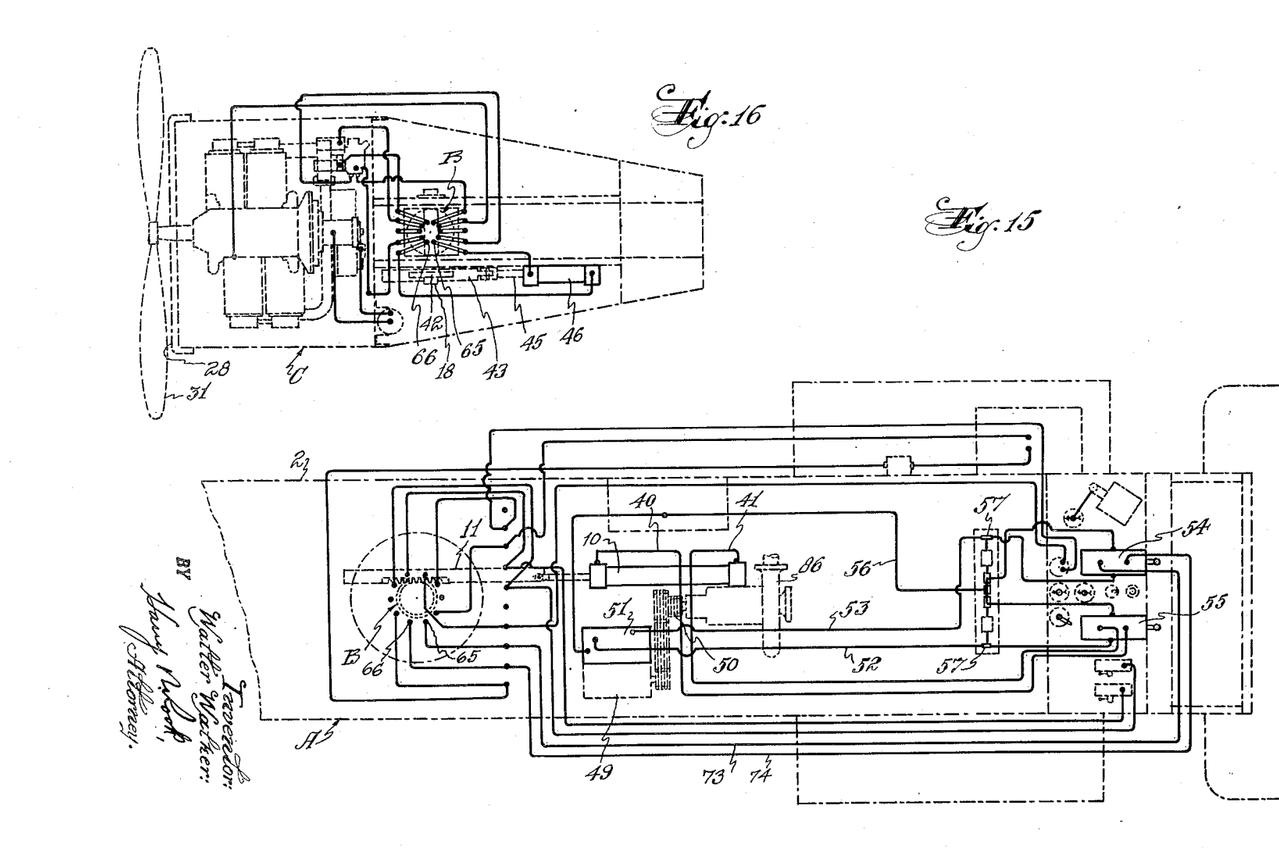
Figure 15 is a diagram of the lower portions of the piping systems for the hydraulic mechanism which actuates the distributing head and for supplying fuel and oil to the engine.
Figure 16 is a similar diagram of the upper portions of said piping systems which are located in the distributing head.

The pipe 80 is supported on a base 80a in the box 81 and serves to conduct the fluent material to be distributed upwardly through the pedestal from a supply tank 83 which is shown as mounted on the motor truck. A pipe 84 (see Figure 14) leads from the supply tank 83 to a centrifugal pump 86 driven by the drive shaft 50a, which forces the fluent material through a pipe 87, a suitable flow meter 88 and a pipe 89 to an inlet fitting 90 into which the lower end of the pipe 80 extends, as best shown in Figure 8. Within the inlet fitting are packing rings 91 disposed at opposite sides of inlet openings 92 in the pipe 80 so as to form an inlet chamber 93 for the fluent material. Such material flows from the inlet chamber 93 through the openings 92 and upwardly through the pipe 80 to the angle fitting 94 at the top of the pipe 80 to which is connected one end of a flexible hose 95, the other end of which is connected to a chambered sleeve 96 mounted on and surrounding the shaft 18 in liquid-tight relation thereto. The chamber 97 within said sleeve communicates through lateral ports 98 with a longitudinal passage 99 in one end portion of said shaft 18 which is connected by another flexible hose 100 to a fitting 101 which is rigidly secured on an end piece 102 of the frame 22 of the distributor head. The fitting 101 is in turn connected to a T-fitting 103 to which are connected flexible hoses 104 which lead respectively to the two arms 106 of the distributing nozzle which have suitable outlet perforations 107.

With this construction, it will be observed that the fluent material will be forced by the pump 86 from the tank upwardly through the pipe 80 in the pedestal and outwardly under pressure through the perforations 107 in the distributing nozzle.

Preferably, a by-pass pipe 108 is connected between the pipe 87 and the tank 83, and suitable valves 109 are provided for at will stopping the supply of fluent material to the distributing nozzle and permitting a circulation thereof from the tank through the pump and back to the tank, without the necessity for stopping the pump in case it should be desirable to temporarily shut off the supply of fluent material to the nozzle.

The distributing nozzle may be of various forms, but preferably comprises two arcuate pipes which are substantially concentric with the axis of rotation of the propeller 31, one end of each pipe being connected by a suitable coupling 110 to the corresponding hose 104 which leads to the T-fitting 103, while the other end of each nozzle pipe has a suitable clean-out opening closed by a removable plug or the like 111.

While it is not necessary, it is desirable to enclose as many of the operating parts of the apparatus as possible to protect them from the fluent material as well as weather conditions. As above described, the distributing head has a casing E and preferably the fluid and fluent material pumps 49 and 86, respectively, as well as the hydraulic device 38 and the rack bar 10, are enclosed in a housing F.

The various controls for operating the engine and for swinging the distributing head may be mounted at any convenient location, but as shown, said controls are arranged in a tower-like structure 112 above the cab of the truck behind and above the distributing head so that the operator may have full vision of surrounding territory and of the distributing head and will be located at a safe distance from the air currents and mist generated by the distributing head. More particularly, the hydraulic control valves 54 and 55 may be mounted on a table 113 which is conveniently located with respect to a seat 114 for the operator.

In operation of the apparatus, the truck is driven to the location at which it is desired to distribute the fluent material, for example, to spray insecticide upon lawns, shrubs or trees. The operator occupies the seat 114 and manipulates the proper controls until the engine and the various pumps are started. The control valves 109 of the insecticide circulating system are then operated so that the insecticide is ejected through the distributing nozzle pipes 106. The rapidly rotating propeller 31 creates a tremendous blast of air which draws the jets of insecticide sprayed from the nozzles, breaks the jets into a mist and propels it forwardly in the form of a cloud. The breaking of the liquid jets into a mist by the propeller blades ensures a drift range of the mist much greater than would be the case if the liquid jets were injected into the air blast ahead of the propeller. The operator then manipulates the controllers 54 and 55 so as to tilt the distributing head upwardly and downwardly and horizontally into the desired positions required to direct the cloud of insecticide over the grass, shrubs or trees, as the case may be, this manipulation of the distributing head being generally illustrated in Figures 2 and 3. The blast of air agitates the foliage and at the same time deposits a killing dose of the insecticide on the top and bottom sides of every leaf, stem, twig and branch. It has been found that the insecticide may be projected a distance of from two (2) to four hundred (400) feet in a quiet atmosphere and up to seven hundred (700) feet with favorable winds. Moreover, the spray may be directed vertically upward or downward to an angle of about thirty degrees (30°) below the horizontal, and the distributing head may be rotated through an angle of three hundred and sixty degrees (360°). The operator has full and clear vision of the entire operation and has complete and constant control of the apparatus. Machines so far built have a capacity of from one-half (½) to twenty-five (25) gallons of insecticidal liquid solution per minute.

The apparatus is simple, relatively inexpensive, and reliable and durable.

While I have shown and described the invention as embodied in certain details of construction, it should be understood that this is primarily for the purpose of illustrating the principles of the invention, and that many modifications and changes may be made in the construction of the machine within the spirit and scope of the invention.

Having thus described the invention, what I claim is:

1. Apparatus of the character described comprising a base, a frame mounted thereon for rotation about a substantially vertical axis and to swing about a horizontal axis that is disposed substantially in a common plane with said vertical axis, power-driven means on said frame for forcing air outwardly, a gear connected to said frame to rotate about said horizontal axis, a rack bar meshing with said gear, a second gear connected to said frame to rotate about said vertical axis, a second rack bar meshing with said second gear, and a fluid pressure operated device for actuating each of said rack bars.

2. Apparatus of the character described including a base, a tubular vertical pedestal thereon, a tubular post mounted to rotate in said pedestal about a vertical axis, a yoke rigidly mounted on the upper end of said post, a horizontal shaft in said yoke having a longitudinal passage through a portion thereof and a lateral passage leading from said longitudinal passage, a frame mounted on said shaft to swing in vertical planes, means on said frame for distributing fluent material, a pipe extending through said post for connection at its lower end to a source of fluent material, a flexible conduit connecting the upper end of said pipe to said lateral passage in said shaft, and a second flexible conduit connecting said longitudinal passage in said shaft to said means for distributing said fluent material.

3. Apparatus of the character described including a base, a tubular vertical pedestal thereon, a tubular post mounted to rotate in said pedestal about a vertical axis, a yoke rigidly mounted on the upper end of said post, a horizontal shaft in said yoke, a frame mounted on said shaft to swing thereabout in vertical planes, a gear fixed on said shaft and connected to said frame, a fluid-operated device on said frame operatively connected to said gear for swinging said frame, two tubes mounted in and extending longitudinally of said tubular post, flexible connections for connecting the lower ends of said tubes respectively to the inlet and the outlet of a fluid pressure generating apparatus, and flexible conduit connections between the upper ends of said tubes and the outlet and inlet respectively of said fluid pressure operated device.

4. Apparatus of the character described including a base, a tubular vertical pedestal thereon, a tubular post mounted to rotate in said pedestal about a vertical axis, a frame mounted on the upper end of said post to rotate therewith and to swing about a horizontal axis relatively thereto, means on said frame for distributing a fluent material, a conduit including a pipe passing through said tubular post for conducting fluent material from a source of supply on said base to said distributing means on said frame, fluid pressure operated means on said frame for swinging said frame, and a conduit including a tube passing through said tubular post for conducting fluid under pressure from a source on said base to said fluid pressure operated means on said frame.

WALTER WALKER.

REFERENCES CITED

The following references are of record in the file of this patent:

UNITED STATES PATENTS

| Number | Name | Date |
|---|---|---|
| 1,379,831 | Lindauer | May 31, 1921 |
| 1,586,997 | Hull | June 1, 1926 |
| 1,782,928 | Knowlson | Nov. 25, 1930 |
| 1,993,635 | Towt | Mar. 5, 1935 |
| 2,163,474 | Sloan | June 20, 1939 |
| 2,238,120 | Launder | Apr. 15, 1941 |
| 2,263,194 | Shepherd | Nov. 18, 1941 |
| 2,374,955 | Raper | May 1, 1945 |
| 2,411,343 | Singer | Nov. 19, 1946 |
| 2,476,960 | Daugherty | July 26, 1949 |